United States Patent
Liu et al.

(10) Patent No.: US 9,648,689 B2
(45) Date of Patent: May 9, 2017

(54) DRIVE UNIT FOR A LIGHTING ELEMENT AND OPERATING METHOD THEREFOR

(71) Applicant: PHILIPS LIGHTING HOLDING B.V., Eindhoven (NL)

(72) Inventors: Junhu Liu, Eindhoven (NL); Harald Josef Gunther Radermacher, Eindhoven (NL); Jie Fu, Eindhoven (NL); Xiao Sun, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/029,722

(22) PCT Filed: Oct. 14, 2014

(86) PCT No.: PCT/IB2014/065290
§ 371 (c)(1),
(2) Date: Apr. 15, 2016

(87) PCT Pub. No.: WO2015/056161
PCT Pub. Date: Apr. 23, 2015

(65) Prior Publication Data
US 2016/0234902 A1 Aug. 11, 2016

(30) Foreign Application Priority Data
Oct. 15, 2013 (CN) .................. PCT/CN2013/001252

(51) Int. Cl.
*H05B 37/00* (2006.01)
*H05B 33/08* (2006.01)

(52) U.S. Cl.
CPC ..... *H05B 33/0845* (2013.01); *H05B 33/0812* (2013.01); *H05B 33/0815* (2013.01)

(58) Field of Classification Search
CPC .. G09G 3/22; G09G 2320/0233; H05B 41/36; H05B 37/0272; H05B 41/00
USPC .................. 315/291, 307, 112, 150, 160–161
See application file for complete search history.

(56) References Cited

U.S. PATENT DOCUMENTS

| | | | |
|---|---|---|---|
| 2002/0109466 A1 | 8/2002 | Huber | |
| 2010/0315002 A1* | 12/2010 | Schmidt | H01K 1/14 315/70 |
| 2011/0043133 A1 | 2/2011 | Van Laanen | |
| 2011/0080110 A1 | 4/2011 | Nuhfer | |
| 2011/0121744 A1* | 5/2011 | Salvestrini | H05B 33/0815 315/246 |
| 2012/0294052 A1* | 11/2012 | Reddy | H02M 1/36 363/49 |

(Continued)

FOREIGN PATENT DOCUMENTS

| | | |
|---|---|---|
| EP | 1555858 B1 | 8/2011 |
| EP | 2477460 A1 | 7/2012 |

(Continued)

*Primary Examiner* — Minh D A (57) ABSTRACT

The invention relates to a drive unit for a lighting element and an operating method for such drive unit and to a lighting element including such drive unit. By selectively providing power to a control unit of the drive unit using different voltages at different stages of the overall drive unit, there is an additional degree of freedom which may be used for improving power efficiency, in particular for reducing standby power consumption, while still meeting specific space and cost constraints.

20 Claims, 3 Drawing Sheets

(56) References Cited

U.S. PATENT DOCUMENTS

2013/0147269 A1    6/2013  Zimmermann
2013/0249397 A1*   9/2013  Chandran .......... H05B 37/0263
                                                          315/85
2013/0257301 A1*  10/2013  Tran ..................... C01B 13/115
                                                          315/200 R

FOREIGN PATENT DOCUMENTS

WO    WO2011087684 A1    7/2011
WO    WO2013061207 A1    5/2013

* cited by examiner

DRIVE UNIT FOR A LIGHTING ELEMENT AND OPERATING METHOD THEREFOR

CROSS-REFERENCE TO PRIOR APPLICATIONS

This application is the U.S. National Phase application under 35 U.S.C. §371 of International Application No. PCT/IB2014/065290, filed Oct. 14, 2014, which claims priority of Chinese Application No. PCT/CN2013/001252, filed Oct. 15, 2013. These applications are hereby incorporated by reference herein.

FIELD OF THE INVENTION

The invention relates to a drive unit for a lighting element and an operating method therefor and a lighting element including such drive unit. More specifically, the invention relates to a drive unit for lighting element including at least one light emitting diode and having an operation mode and a standby mode and to a method of operating such drive unit for such lighting element.

BACKGROUND OF THE INVENTION

In many areas, lighting elements including one or more light emitting diodes (LED) are developed as a replacement for incandescent lamps, in particular as a replacement of halogen lamps.

In addition to the simple ON/OFF states of conventional lamps provided for by controlling the power supply, lighting elements (including LEDs) may now provide more sophisticated options including communication (i.e. remote control of specific lighting elements), in particular as to dimming, wherein this makes it necessary that the a control unit of the lighting element is supplied with power even if the optical engine is off. Such mode in which the lighting element is ready to communicate and to be controlled while there is no lighting provided is called standby mode.

Preferably, during standby mode, the power consumption of the lighting element in total should be low. For example, in the context of a MR 16 bulb, the CLEMA (Federation of National Manufactures Association for Luminaire and Electrotechnical Components for Luminaire in the European Union) has a 0.5-Watt standby power requirement.

Achieving a desired power efficiency and standby power consumption poses difficulties in that the means conventionally employed for such end are in contrast to other constraints on the design, like the available space and cost consideration.

SUMMARY OF THE INVENTION

It is an object of the present invention to provide a drive unit for a lighting element, an operating method for a drive unit and a lighting element including such drive unit which allow for a better power efficiency and standby power consumption under space and cost constraints on the design of the lighting element.

In a first aspect of the present invention a drive unit for a lighting element is presented, the lighting element comprising at least one light source comprising at least one light emitting diode, the drive unit comprising: a first power converter arranged for receiving input power by drawing at least a part of a predefined current waveshape and for outputting a bus voltage, a control unit arranged for controlling the drive unit, a second power converter for providing power to the control unit, the input of the second power converter being coupled at least to the bus voltage, wherein the drive unit has, under the control of the control unit, an operation mode in which by means of the bus voltage an LED voltage is provided for operating the at least one light emitting diode and a standby mode in which the LED voltage for operating the at least one light emitting diode is not provided while power is provided to the control unit, wherein the control unit is arranged for adjusting a level of the bus voltage outputted by the first power converter from an operation level in the operation mode to a standby level in the standby mode and vice versa.

In a second aspect of the present invention a lighting element is presented, comprising: a first power converter arranged for receiving input power by drawing at least a part of a predefined current waveshape and for outputting a bus voltage, a control unit arranged for controlling the lighting element, a second power converter for providing power to the control unit, the input of the second power converter being coupled at least to the bus voltage, at least one light source, comprising at least one light emitting diode, wherein the lighting element has, under the control of the control unit, an operation mode in which the at least one light emitting diode is operated by means of the bus voltage and a standby mode in which the at least one light emitting diode is not operated while power is provided to the control unit, wherein the control unit is arranged for adjusting a level of the bus voltage outputted by the first power converter from an operation level in the operation mode to a standby level in the standby mode and vice versa.

In a third aspect of the present invention an operating method of a drive unit for a lighting element including at least one light emitting diode is presented, which is arranged such that the lighting element has an operation mode in which the at least one light emitting diode is operated by means of a bus voltage and a standby mode in which the at least one light emitting diode is not operated while power is provided to a control unit, the operating method comprising the steps of: receiving an input power by drawing at least a part of a predefined current waveshape, converting the input voltage and outputting the bus voltage, adjusting a level of the outputted bus voltage, upon switching between the operation mode and the standby mode, and, in standby mode, converting the bus voltage for providing power to the control unit.

The present invention is based on the insight that by selectively providing power to the control unit using different voltages at different stages of the overall lighting element, there is an additional degree of freedom which may be used for improving power efficiency, in particular for reducing standby power consumption, while still meeting specific space and cost constraints.

The predefined current waveshape may take a variety of forms depending of the circumstances and the particular implementation. Examples of such predefined current waveshape may be defined as indicated in the following list: a predefined portion of a cycle (in particular one or more parts of the cycle, e.g. the first x % of the cycle, the peak input current power being higher than an average power or in a predefined relation to the root means square input voltage times a factor, or the like).

It is noted that the predefined current waveshape (or predefined load) may preferably and beneficially be provided to allow the lighting element to be powered by a conventional arrangement including an electronic transformer, which needs a particular load to operate.

According to the present invention, even in standby mode, the first power converter is operating and drawing power according to a predefined regime (even though the regime for standby mode may be different from that for operation mode), such that the lighting element may be used in the context of electronic transformers providing an input voltage.

In standby mode, however, it is not strictly necessary for the predefined current waveshape (or load) to be provided continuously: if the load provided is sufficient during cyclic portions of the standby mode, enough energy may be taken from the input and stored (e.g. in a capacitance) for the control unit to maintain operation (e.g. being supported by the capacitance until the next such cycle).

Advantageously, even during standby mode the load presented by the lighting element may be sufficiently high for an electronic transformer to operate, such that also a plurality of lighting element may be supplied by one electronic transformer, regardless of one or more of the plurality of lighting element may be in standby mode.

In a preferred embodiment, in the drive unit or in the lighting element the input of the second power converter is coupled to the first power converter via a switching circuitry, the switching circuitry also coupling the input of the second power converter to a further voltage provided within the drive unit or the lighting element.

In particular, in an advantageous modification, the switching circuitry is arranged for providing, to the second power converter, the bus voltage during the standby mode and the further voltage during the operation mode.

As an additional option to this modification, there might be provided a third power converter outputting the LED voltage for powering the at least one light emitting diode, the input of the third power converter being coupled at least to the bus voltage, wherein the further voltage is the LED voltage or another voltage provided by the third power converter.

The power supply to the control unit is not limited to drawing power directly from the bus voltage, but also other voltages provided during operation of the lighting element may be used for powering the control unit. If during the operation mode the second power converter powering the control unit is supplied with the LED voltage being lower than the bus voltage, a power loss due to the conversion in the second power converter is reduced, thereby reducing particularly the overall heat generation inside the lighting element.

In another modification of the above embodiment, during operation mode and standby mode, the switching circuitry is arranged such that the input of the second power converter is electrically connected to the further voltage when the bus voltage is above a predetermined threshold level and is electrically connected to the output of the first power converter when the bus voltage is below the predetermined threshold level.

Advantageously, by means of such threshold value for the bus voltage, simple circuitry may be used for switching between the bus voltage and the LED voltage upon switching between the operation mode and the standby mode, wherein furthermore the control of the bus voltage may result also in a selection of the voltage used for powering the control unit.

It is to be noted that the two modifications as discussed above may coincide to a certain degree: except for transition periods (like startup or the change between operation mode and standby mode) the threshold approach may indeed be used for ensuring that during standby mode the (reduced) bus voltage and during operation mode the further voltage (e.g. the LED voltage) is used for powering the control unit.

It is further to be noted that the control of the bus voltage may include further options, even though preferably there are at least two levels provided for the bus voltage, one level for the operation mode and another level for the standby mode.

It may be foreseen that the bus voltage is controllable continuously in a given range, e.g. such that the provided bus voltage is proportional to a reference value like a reference voltage.

In a preferred embodiment the first power converter is arranged for outputting, during the operation mode and/or the standby mode, the bus voltage being higher than the input voltage, wherein in a preferred modification of the this embodiment the first power converter comprises a boost circuitry.

In a preferred embodiment the second power converter comprises a linear voltage regulator, preferably a low dropout regulator.

A low dropout regulator (LDO) may be less efficient for higher voltage drops in comparison to other regulators (like a switched mode conversion). However, in comparison to such other DC-DC circuits, the costs may be lower by a factor of 2.5 to 3, wherein the higher complexly of such DC-DC circuits may furthermore not be affordable if space is a severe constraint.

In a preferred embodiment the drive unit is arranged for providing the LED voltage being lower than the bus voltage, wherein in a preferred modification of this embodiment the third power converter (see above) comprises a buck circuitry.

In a preferred embodiment the input voltage is 12 V of alternating current, wherein the first power converter includes a bridge rectifier.

The provision of 12 V of alternating current allows the lighting element to replace conventional light sources such as halogen bulbs designed for such voltage.

In a preferred modification of the above embodiment the bus voltage is in the range of 20 to 28 V of direct current and the LED voltage is, at least during operation mode, in the range of 8 to 16 V of direct current.

In the context of using, for example, a boost converter for converting the input voltage to the bus voltage and buck converter for converting the bus voltage into the LED voltage, energy is drawn by the buck converter from a capacitance of the boost converter, wherein it is necessary that the capacitance stores enough energy to sustain the buck converter operation. By providing a sufficiently high voltage, the capacitance may be small enough to meet space constraints in an implementation, e.g. in the case of a multifaceted reflector light bulb known as MR16.

In a preferred embodiment the lighting element is a multifaceted reflector light bulb having a diameter of approximately 51 mm.

In a preferred embodiment the control unit is adapted to receive instructions and to control the lighting element in accordance to the instructions.

The control unit may have additional functions beyond the ON/OFF or dimming control of the lighting element.

It shall be understood that the drive unit of claim 1, the lighting element of claim 14 and the operating method of claim 15 have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
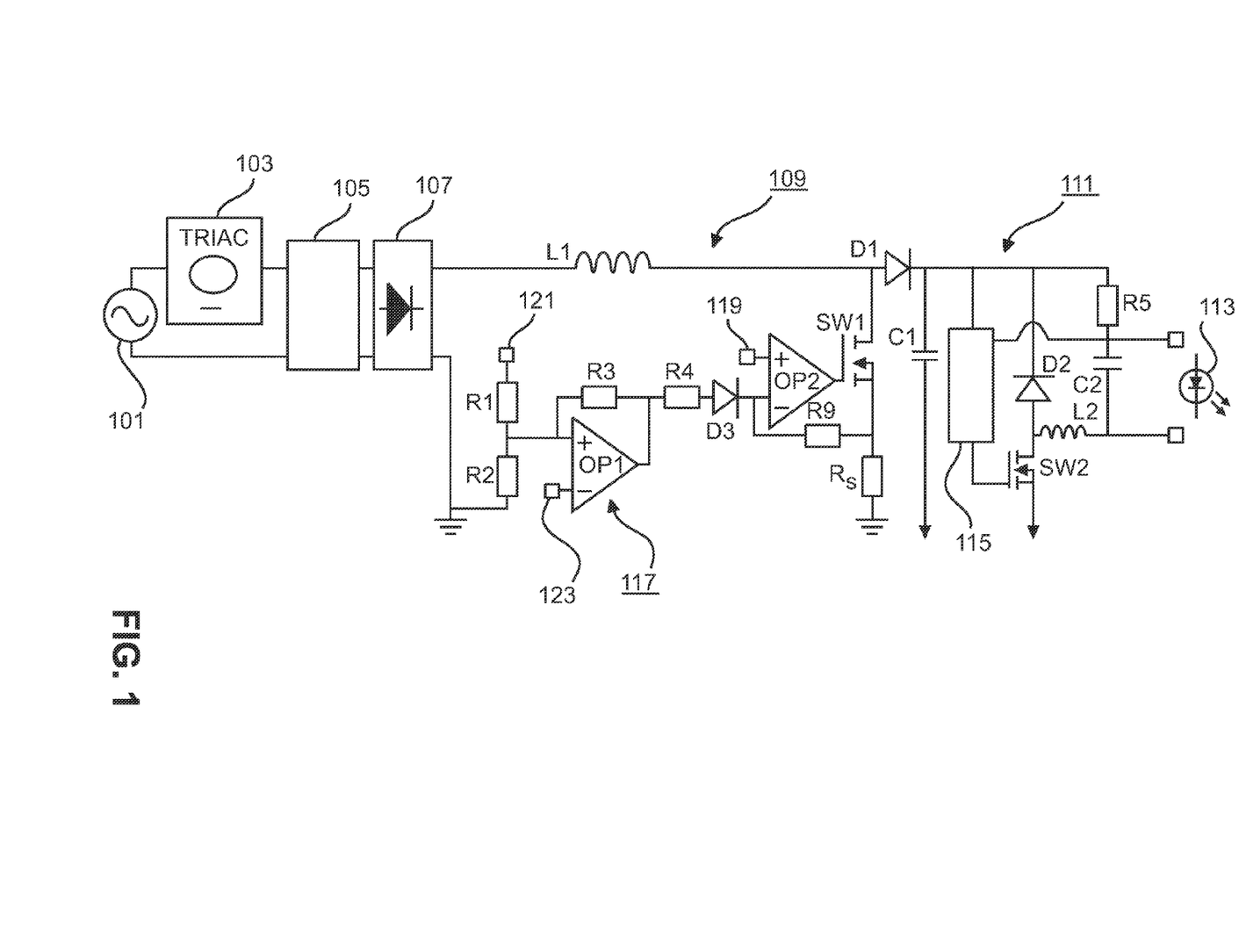
FIG. 1 shows a first portion of a circuit of a lighting element in accordance with an embodiment of the invention.

FIG. 1 shows a first portion of a circuit of a lighting element including a drive unit in accordance with an embodiment of the invention.

The present embodiment is directed to a multifaceted reflector (MR) light bulb in which LEDs are employed as light source and which is provided with a control unit for communication and control.

A MR light bulb is a wide spread format for halogen bulbs, wherein specifically the type MR16 (sixteen eighths of an inch, i.e. 2 inch, or approximately 51 mm in diameter) is one of the most widely used bulbs in the lighting industry.

In a traditional MR16 application scenario the system includes a wall-mount TRIAC working as dimmer with 110/220 VAC 50-60 Hz feed from mains and phase cutting the mains sinusoidal waveform as per the dimmer setting, and an Electronic Transformer (ET) receiving phase cut power from the TRIAC and converting it to 12 VAC at a frequency of about 30 KHz. One or a group of MR16 bulbs (normally halogen) are connected to the ET and generate light to the user. Here, the TRIAC works as bulbs ON/OFF and dimmer control, wherein the conventional MR16 bulb functions as a light source with zero power consumption when the bulb is required to be turned off.

With the LED technology rapidly growing up, light emitting diodes (LED) are replacing halogen in MR16 light sources. As LEDs may easily be controlled, more and more sophisticated control mechanisms may be implemented with the LED based MR16 bulb. Here, typically the control is shifted from the TRIAC dimmer to the MR16 bulb.

For a conventional controllable MR16 bulb based on LEDs, a typical architecture might include a microcontroller unit (MCU) covering communication, optics ON/OFF and dimming control (e.g. interpreting digital commands into PWM signal) and an electronic power driver converting PWM signal into constant current to drive the LED optical engine. Given the control unit (or communication unit, i.e. MCU and associated circuit) is located in the bulb, a control request (e.g. control system, control panel, RF controller etc.) may only be received when the control unit (and therefore the bulb in total) is powered, even if the optics are turned off (e.g. during standby). A state in which the bulb's communication and control circuit is on, and the optical engine is off (i.e. the LEDs do not output light) may be called standby mode.

As indicated above, power efficiency and standby power consumption are critical to implementations of MR16 bulbs. For example, the CLEMA (Federation of National Manufactures Association for Luminaire and Electrotechnical Components for Luminaire in the European Union) has a solid 0.5 W standby power requirement.

Conventionally, in order to meet such requirement, controllable MR16 bulbs employ a DC-DC converter as an auxiliary power supply. The use of a circuitry such as an electronic switch mode converter, however, involves comparatively high costs and it is also a serious challenge to meet the space constraints involved in MR 16 bulbs. If, on the other side, a comparatively cheap converter like a low dropout converter (LDO) is used, which requires also less space, it is difficult to meet the standby power requirement of 0.5 W: with a bus voltage of typically 20-28 VDC converted to 3.3 VDC and a current requirement of 30 mA for the control unit, the power consumption is about 0.72 W (0.03 mA×(20+28)/2 V), exceeding the desired 0.5 W.

The first portion of the circuit of the lighting element shown in FIG. 1 is connected to a conventional power supply 101 in the form of an AC mains to which a TRIAC 103 and an electronic transformer 105 are connected. The electronic transformer 105 supplies 12 VAC at a frequency of about 30 KHz to the first portion of the circuit of the lighting element.

To be more specific, the electronic transformer 105 is connected to a bridge rectifier 107 which in turn is connected to a boost converter 109 including inductance L1, switch SW1, diode D1, operational amplifier OP2, resistances R9 and R$_S$, and capacitance C1. The current through the inductance L1 is set by value of the resistance R$_S$ and a current reference voltage applied to the non-inverting input 119 of the operational amplifier OP2. The current reference voltage can be set as an hysteresis value for easy control.

The boost converter 109 provides a bus voltage for a buck converter 111 for driving the plural light emitting diodes 113 (only one shown for simplicity). The buck converter 111 includes a buck IC 115, inductance L2, diode D2, capacitance C2, switch SW2 and resistance R5 and regulates the bus voltage to a constant current to drive the LEDs 113.

The boost converter 109 (and the overall lighting element) is arranged for drawing power from the electronic transformer 105 in a predetermined way, thus ensuring that there is a sufficient load to the electronic transformer 105 to operate. As the skilled person is familiar with the requirements posed by such electronic transformer 105, a detailed discussion thereof is not necessary here.

There is further provided a control circuitry 117 including four resistances R1 to R4, an operational amplifier OP1 and a diode D3, wherein the control circuitry 117 is connected to the inverting input of operational amplifier OP2 (the non-inverting input 119 of OP2 being provided in operation with the current reference voltage). A first input 121 of the control circuitry 117 is provided with the bus voltage and a second input 123 (being the inverting input 123 of the operational amplifier OP1) of the control circuitry 117 is provided with a bus reference voltage.

The control circuitry 117 is provided for setting the value of bus voltage. In the present embodiment, there is provided a bus voltage value for operation mode in the range of 20

VDC to 28 VDC (20 VDC≤$V_{Bus}$≤28 VDC) and a bus voltage value for standby mode in the range of 10 VDC to 18 VDC (10 VDC≤$V_{Bus}$≤18 VDC). The upper and lower range limit for the respective bus voltage value can be obtained via a hysteresis control loop. For this instance, the resistances R1, R2, and R3 determine the threshold range. By setting the bus reference voltage, switching between the ranges for the bus voltage is achieved.

Figure 2:
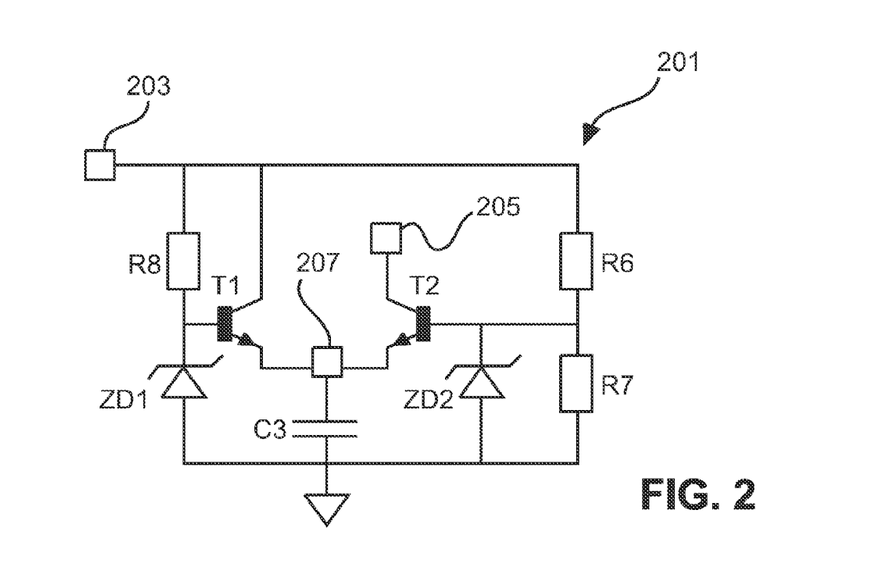
FIG. 2 shows a second portion of the circuit of the lighting element in accordance with the embodiment of FIG. 1.

FIG. 2 shows a second portion of the circuit of the lighting element in accordance with the embodiment of FIG. 1. The second portion of the circuit of the lighting element is a switching circuitry 201 consisting of transistors T1, T2, Zener diodes ZD1, ZD2, resistances R6 to R8 and capacitance C3. The circuitry is provided with two inputs 203, 205, wherein in operation the bus voltage (see FIG. 1 above) is provided to the first input 203, while the second input 205 is provided with the cathode voltage of the LED (see FIG. 1 above). The circuitry selectively enables transistor T1 or transistor T2 to supply the respective voltage applied to the input 203 or 205 to an output 207 of the switching circuitry 201. With suitable parameter selection of the values of ZD1, ZD2, R8, R6, and R7, according to the present embodiment, it is possible to have the transistor T1 operating and the transistor T2 being turned off, when the bus voltage provided to the input 203 is equal to or smaller than 18V. In case the bus voltage provided to the input 203 is equal to or larger than 20V, the transistor T1 is turned off while the transistor T2 is operating, thereby providing the input of the cathode voltage of the LED to the output 207.

Figure 3:
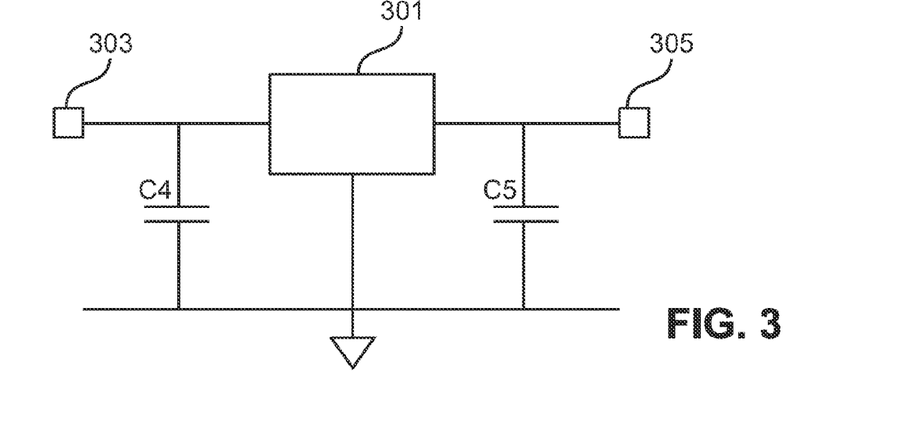
FIG. 3 shows a third portion of the circuit of the lighting element in accordance with the embodiment of FIGS. 1 and 2.

FIG. 3 shows a third portion of the circuit of the lighting element in accordance with the embodiment of FIGS. 1 and 2. The third portion of the circuit includes a low dropout regulator 301 and two capacitances C4 and C5. The low dropout regulator converts an input voltage (see output 207 of FIG. 2) provided at an input 303 to an output voltage supplied to the output 305.

Figure 4:
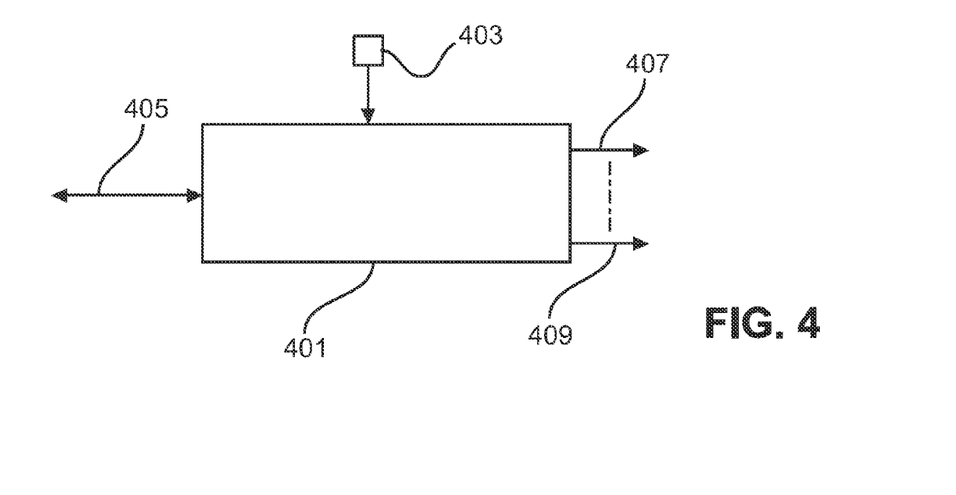
FIG. 4 shows a fourth portion of the circuit of the lighting element in accordance with the embodiment of FIGS. 1 to 3.

FIG. 4 shows a fourth portion of the circuit of the lighting element in accordance with the embodiment of FIGS. 1 to 3. The fourth portion includes the control unit 401 having several inputs and outputs. The control unit 401 is powered (input 403) by the output 305 of the low dropout regulator 301 of FIG. 3. The control unit 401 is arranged for communication with the outside of the lighting element, e.g. to a controller of the overall lighting arrangement in which the lighting element is included (illustrated by arrow 405). The control unit 401 also provides the bus reference voltage (indicated by reference number 407) used for setting the bus voltage (see FIG. 2 above). Further, the control unit 401 provides additional control signals or voltages (illustrated by reference number 409).

The control unit 401 is in this embodiment an MCU, which communicates to a control system or monitors local button to perform the lighting element ON/OFF and dimming control. For an ON and/or dimming command, the control is interpreted as directed to the operation mode and accordingly the bus reference voltage is set to a value for the normal bus voltage for operation of the lighting element. An OFF command is interpreted directed to the standby mode and accordingly, the bus reference voltage is set to a value for the bus voltage being reduced to a standby bus voltage.

The present embodiment provides a mechanism of reducing standby power as follows: the low dropout regulator 301 is coupled via the switching circuitry 201 of FIG. 2 to the bus voltage and the cathode voltage of the light emitting diodes 113. In the operation mode, the control unit 401 is powered by means of the cathode voltage of the light emitting diodes 113, which are driven by means of the bus voltage. When the lighting element is switched from the operation mode to the standby mode, the bus voltage is lowered by means of the control circuitry 117 controlled by the control unit 401, wherein furthermore the input 303 of the low dropout regulator 301 is provided with the lowered bus voltage instead of the cathode voltage of the light emitting diodes 113. This allows for a reduction of the standby power consumed, wherein further the thermal performance is also improved with less power consumption on the driver board.

When the light emitting diodes 113 are turned off in standby mode, the low dropout regulator 301 cannot source input power from the cathode voltage of the light emitting diodes 113, as otherwise there would be a leakage current flowing through the light emitting diode string, resulting in an LED blinking issue. In the present invention, this is avoided by switching from using the cathode voltage to the bus voltage upon switching from operation mode to standby mode.

On the other hand, when the low dropout regulator input is switched from the cathode voltage to the bus voltage for the standby mode, the power loss would be high if the bus voltage were still maintained at operating level, namely, at 20-28 VDC. By reducing the level of the bus voltage for the standby mode, this is avoided: by changing the bus voltage from 20-28 VDC to 10-18 VDC, the power loss on the low dropout regulator 301 can be reduced by up to 40%.

Depending on the value of the reference bus voltage provided to the inverting input 123 of the operational amplifier OP1, the bus voltage outputted by the boost converter 109 is either in the range of 20 to 28 VDC for the operation mode or in the range of 10 to 18 VDC for the standby mode. In the operation mode, the output of the buck converter 111 (namely the cathode voltage) corresponds to the difference between the bus voltage and a forward voltage and is therefore in the range of 8 to 16 VDC.

By means of suitable setting of the parameters for the resistances R6 to R7 and the Zener diodes ZD1 and ZD2, it is achieved that the gate voltage of transistor T1 is larger than the gate voltage of transistor T2 if the bus voltage (provided to input 203) is equal to or smaller than 18 VDC, whereas the gate voltage of transistor T1 is larger than the gate voltage of transistor T1 if the bus voltage (provided to input 203) is equal to or larger than 20 VDC. In the case that the gate voltage of transistor T1 is larger than that of transistor T2, the transistor T1 overrides the transistor T2 and draws power from the bus voltage (input 203) to the output 207 (connected to the low dropout regulator of FIG. 3). In the case that the gate voltage of transistor T2 is larger than that of transistor T1, the transistor T2 overrides the transistor T1 and draws power from the cathode voltage (input 205) to the output 207 (connected to the low dropout regulator of FIG. 3).

By means of the present embodiment including the control unit 401, the boost logic (including the boost converter 109 and the control circuitry 117), the buck logic (including the boost converter 111), and the switching circuitry 201, the input of low dropout converter can be kept at a low voltage level, wherein furthermore the power loss in both operating and standby mode due to the low dropout regulator is reduced. This is extremely useful to a controllable lamp, for which it is desired to meet the 0.5 Watt standby power requirement from CLEMA, for example.

Figure 5:
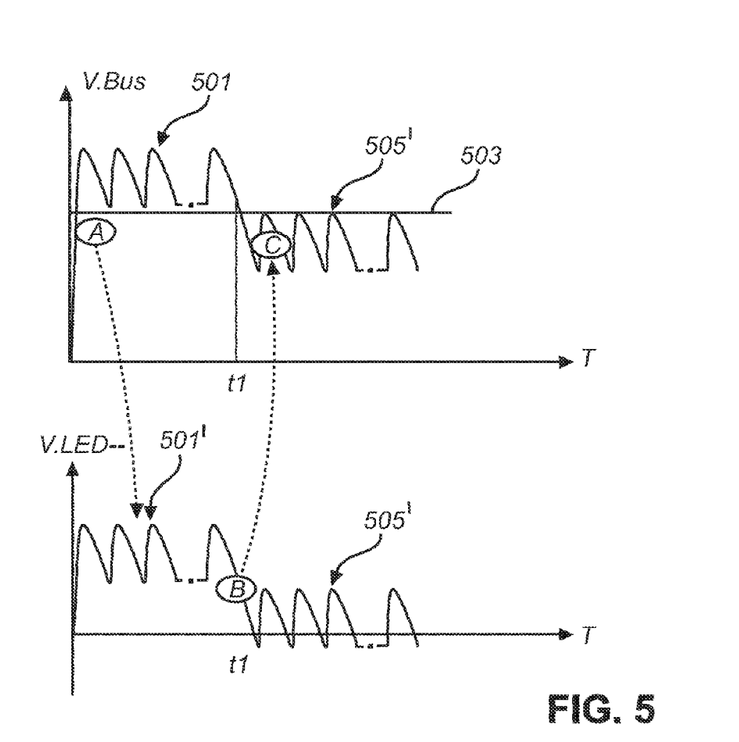
FIG. 5 illustrates values of a bus voltage and an LED voltage in accordance with the embodiment of FIGS. 1 to 4.

FIG. 5 illustrates values of a bus voltage and an LED voltage in accordance with the embodiment of FIGS. 1 to 4.

During the first powering up of the lighting element, before the control unit 401 has an operating voltage for setting the bus reference voltage, the electronic transformer 105 charges the bus voltage 501 directly (before point A). The low dropout regulator 301 draws its input from the bus voltage via the transistor T1. As soon as the bus voltage 501 rises up and exceeds a threshold value 503 (20 VDC in this case), the transistor T2 overrides the transistor T1 in order to provide power to the low dropout regulator 301 from the cathode voltage 505 of the light emitting diodes 113 (point A). During the operation mode (up to time t1), the low dropout regulator 301 and thus the control unit 401 is powered by means of the cathode voltage 505. At time t1, a user provides an instruction to the control unit 401 (see arrow 405 illustrating the communication in FIG. 4) to switch to standby mode and accordingly, the control unit 401 changes the outputted bus reference voltage such that the bus voltage 501' is reduced (together with controlling the light emitting diodes 113 to be turned OFF) (point B). The switching circuitry 201 provides that the low dropout regulator 301 is powered by the reduced standby bus voltage 505' (point C). In accordance with the reduced bus voltage, there is also a corresponding shift in the cathode voltage of the buck converter 111.

In case an electronic transformer is used it is considered to be necessary that there is at least a predetermined load is provided by the lighting element (as otherwise the electronic transformer would no longer be able to function). In view thereof, it is not possible to just stop the operation of the boost converter 109 in order to obtain a bus voltage somewhat corresponding to the rectified input voltage. If, however, the application of the lighting element does not have the above constraint (e.g. the input voltage is provided by means of a battery), the reduction of the bus voltage may also be achieved by shutting down the operation of the boost controller.

Figure 6:
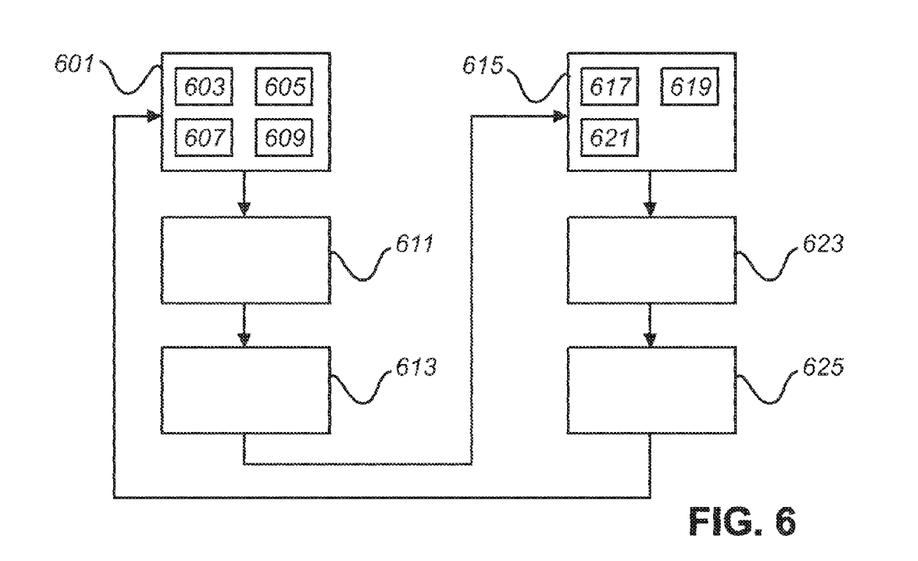
FIG. 6 shows a schematic flow diagram illustrating an operating method in accordance with an embodiment of the invention.

FIG. 6 shows a schematic flow diagram illustrating an operating method in accordance with an embodiment of the invention.

In an operating step (601), the lighting element is operated in the operation mode, wherein an input voltage is received (603) and converted for outputting (605) a bus voltage. Furthermore, the bus voltage is converted and an LED voltage for driving the at least one light emitting diode is outputted (607), such that the lighting element provides light. The LED voltage is further used for powering (609) the control unit. The actions 603-609 mentioned above are provided basically simultaneously during the operating step 601.

In a first reception step 611, an instruction for switching the mode from operation to standby mode is received, followed by a control in a first control step 613 by the control unit for such switch, including the reduction of the bus voltage provided by changing a bus reference voltage.

During an standby step 615, the lighting element is operated in the standby mode, wherein the input voltage is still received (617) and converted for outputting (619) the bus voltage, which is reduced. However, the light emitting diodes are no longer driven and no light is insofar outputted by the lighting element. The reduced bus voltage is used for powering (621) the control unit. The actions 617-621 mentioned above are provided basically simultaneously during the standby step 615.

In a second reception step 623, an instruction for switching the mode from standby to operation mode is received, followed by a control in a second control step 625 by the control unit for such switch, including the increasing of the bus voltage provided by changing the bus reference voltage.

The flow then returns to the operation mode of operating step 601.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single processor, device or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. An apparatus including a drive unit for driving a lighting element, the lighting element comprising at least one light source comprising at least one light emitting diode, the drive unit comprising:
a first power converter arranged for receiving input power by drawing at least a part of a predefined current waveshape and for outputting a bus voltage,
a control unit arranged for controlling the drive unit,
a second power converter for providing power to the control unit, the input of the second power converter being coupled at least to the bus voltage,
wherein the drive unit has, under the control of the control unit, an operation mode in which by means of the bus voltage an LED voltage is provided for operating the at least one light emitting diode, and a standby mode in which the LED voltage for operating the at least one light emitting diode is not provided and no lighting is provided by the at least one light emitting diode while power is provided to the control unit,
wherein the control unit is arranged for adjusting a level of the bus voltage outputted by the first power converter from an operation level in the operation mode to a standby level in the standby mode and vice versa.

2. The apparatus of claim 1, wherein the input of the second power converter is coupled to the first power converter via a switching circuitry, the switching circuitry also coupling the input of the second power converter to a further voltage provided within the drive unit.

3. The apparatus of claim 2, wherein the switching circuitry is arranged for providing, to the second power converter, the bus voltage during the standby mode and the further voltage the during the operation mode.

4. The apparatus of claim 3, further comprising a third power converter outputting the LED voltage for powering the at least one light emitting diode, the input of the third power converter being coupled at least to the bus voltage, wherein the further voltage is the LED voltage or another voltage provided by the third power converter.

5. The apparatus of claim 4, wherein the third power converter comprises a buck circuitry.

6. The apparatus of claim 2, wherein, during operation mode and standby mode, the switching circuitry is arranged such that the input of the second power converter is electrically connected to the further voltage when the bus voltage is above a predetermined threshold level and is electrically connected to the output of the first power converter when the bus voltage is below the predetermined threshold level.

7. The apparatus of claim 1, wherein the first power converter is arranged for outputting, during the operation mode and/or the standby mode, the bus voltage being higher than the input voltage.

8. The apparatus of claim 7, wherein the first power converter comprises a boost circuitry.

9. The apparatus of claim 1, wherein the second power converter comprises a linear voltage regulator.

10. The apparatus of claim 1, wherein drive unit is arranged for providing the LED voltage being lower than the bus voltage.

11. The apparatus of claim 1, wherein the input voltage is 12 V of alternating current, wherein the first power converter includes a bridge rectifier.

12. The apparatus of claim 11, wherein, at least during operation mode, the bus voltage is in the range of 20 to 28 V of direct current and the LED voltage is in the range of 8 to 16 V of direct current.

13. The apparatus of claim 1, wherein the control unit is adapted to receive instructions and to control the lighting element in accordance to the instructions.

14. The apparatus of claim 1, further comprising:
a multifaceted reflector light bulb having a diameter of approximately 51 mm; and
the at least one light source comprising the at least one light emitting diode.

15. A method of operating a drive unit for a lighting element including at least one light emitting diode, such that the lighting element has an operation mode in which the at least one light emitting diode is operated by using a bus voltage, and a standby mode in which the at least one light emitting diode is not operated and no lighting is provided by the at least one light emitting diode while power is provided to a control unit, the method comprising:
receiving an input power by drawing at least a part of a predefined current waveshape,
producing the bus voltage from the received input power,
adjusting a level of the outputted bus voltage upon switching from the operation mode to the standby mode, and,
in the standby mode, converting the bus voltage to an output voltage less than the bus voltage for providing power to the control unit.

16. The method of claim 15, further comprising:
providing a control signal to the control unit;
in response to the control signal, the control unit outputting to a control circuit a bus reference voltage; and
the control circuit comparing the bus voltage and the bus reference voltage and in response to the comparison outputting a signal to control the control unit to cause the drive unit to switch the lighting element between the operating mode and the standby mode.

17. An apparatus, comprising:
a first power converter configured to receive input power by drawing at least a part of a predefined current waveshape, and to output a bus voltage,
a control unit configured to control the apparatus, in response to at least one control signal, to be selectively in one of: an operation mode wherein the bus voltage has an operation voltage level which is converted to a light emitting diode (LED) voltage for illuminating at least one LED, and a standby mode wherein the bus voltage has a standby voltage level which is less than the operation voltage level and no lighting is provided by the at least one light emitting diode;
a voltage regulator configured to be connected to receive the bus voltage when the apparatus is in the operation mode and to receive a cathode voltage of the LED when the apparatus is in the standby mode, and to supply an output voltage to the control unit in both the operating mode and the standby mode.

18. The apparatus of claim 17, wherein the control unit is configured to output a bus reference voltage in response to the control signal, wherein the bus reference voltage has a first value in the operating mode and has a second value, different from the first value, in the standby mode, the apparatus further comprising a control circuit configured to receive the bus voltage and the bus reference voltage and in response thereto to cause the bus voltage to have the operating voltage when the bus reference voltage has the first value and to cause the bus voltage to have the standby voltage when the bus reference voltage has the second value.

19. The apparatus of claim 17, further comprising a switching circuit configured to receive the bus voltage and the cathode voltage, and when the bus voltage is less than a first threshold voltage to supply the bus voltage to the voltage regulator and when the bus voltage is greater than a second voltage to supply the cathode voltage to the cathode voltage to the voltage regulator.

20. The apparatus of claim 17, wherein the operating voltage level is in a range of 20 VDC to 28 VDC, and the standby voltage level is in a range of 10 VDC to 18 VDC.

* * * * *